(12) United States Patent
Cheung et al.

(10) Patent No.: US 10,516,364 B1
(45) Date of Patent: Dec. 24, 2019

(54) FIELD-DEPLOYABLE SOLAR PANEL STAND

(71) Applicant: SBM Solar, Inc., Concord, NC (US)

(72) Inventors: Osbert Cheung, Concord, NC (US);
William Edward Hodges, III,
Greenville, NC (US)

(73) Assignee: SBM Solar, Inc., Concord, NC (US)

( * ) Notice: Subject to any disclaimer, the term of this patent is extended or adjusted under 35 U.S.C. 154(b) by 29 days.

(21) Appl. No.: 16/013,284

(22) Filed: Jun. 20, 2018

(51) Int. Cl.
*F16M 11/00* (2006.01)
*H02S 30/20* (2014.01)
*F16M 11/38* (2006.01)

(52) U.S. Cl.
CPC .............. *H02S 30/20* (2014.12); *F16M 11/38* (2013.01)

(58) Field of Classification Search
CPC ......... Y02B 10/12; Y02E 10/47; H02S 20/00; H02S 30/10; H02S 20/10; H02S 20/30; H02S 30/20; F24S 25/61; F24S 25/20; F24S 25/12; F24S 2025/012
USPC .................. 248/237, 165, 166; 52/173.3
See application file for complete search history.

(56) References Cited

U.S. PATENT DOCUMENTS

| | | | | |
|---|---|---|---|---|
| 4,269,173 A * | 5/1981 | Krueger | ................. | F24S 25/10 126/634 |
| 6,073,894 A * | 6/2000 | Chen | ................. | A47J 37/0786 108/115 |
| 8,939,143 B2 * | 1/2015 | Zuritis | ................. | H02S 20/10 126/569 |
| 9,447,990 B2 * | 9/2016 | Zuritis | ................. | H02S 20/10 |
| 10,044,319 B2 * | 8/2018 | Zante | ................. | H02S 20/23 |
| 2004/0084581 A1 * | 5/2004 | Chang | ................. | B25H 1/04 248/166 |
| 2012/0222372 A1 * | 9/2012 | Hilber | ................. | F24S 25/617 52/173.3 |

* cited by examiner

Primary Examiner — Steven M Marsh
(74) Attorney, Agent, or Firm — Clements Bernard Walker (57) ABSTRACT

A field-deployable solar panel stand configured to transition between a collapsed configuration for carrying and an expanded configuration for use. The stand includes a plurality of linear posts, cross members, legs and support members interconnected through a plurality of joint assemblies configured to slide along a length of the linear posts to transition the stand between the collapsed and expanded configurations.

20 Claims, 7 Drawing Sheets

FIELD-DEPLOYABLE SOLAR PANEL STAND

TECHNICAL FIELD AND BACKGROUND

The present invention relates generally to the field of deployable solar panels, and more particularly, to a military-grade, field-deployable solar panel stand configured to transition between a collapsed configuration for carrying and an expanded configuration for supporting a solar panel during use.

Networked soldiers are typically equipped with communications and other portable electronic equipment. Power to such equipment is typically supplied by battery packs carried by the soldier. The battery packs are rechargeable and can be recharged at dedicated charging stations at various locations within military installations. When charging stations are not readily available, such as when soldiers are in remote locations, the battery packs can be recharged using portable solar panels.

Portable solar panels can be provided in various wattages, for example, 60 W and 120 W configurations. Portable solar panels are typically configured with an array of solar cells interconnected through flexible electrical and physical connections that permit the solar panel array to fold to a compact configuration for stowing and carrying. For use, the solar panel array unfolds to a planar configuration such that the solar cells are oriented at an optimum angle to absorb sunlight.

In remote locations, it can be difficult to stably support a deployed solar panel array at an optimum angle to absorb sunlight. As such, what is needed is a stand that not only stably supports a solar panel array at an optimum angle, but also folds to a compact configuration for carrying between uses.

BRIEF SUMMARY

In one aspect, the inventive concepts disclosed herein are directed to a field-deployable solar panel stand including first and second parallel linear posts, first and second joint assemblies slidable and fixed, respectively, along a length of the first linear post, third and fourth joint assemblies slidable and fixed, respectively, along a length of the second linear post, a first cross member pivotably connected at a first end to the first joint assembly and at a second end to the fourth joint assembly, a second cross member pivotably connected at a first end to the second joint assembly and at a second end to the third joint assembly, a first leg pivotably connected at a first end to the first joint assembly and at a second end to a foot, a second leg pivotably connected at a first end to the third joint assembly and at a second end to the foot, a first support member pivotably connected at a first end to the second joint assembly and at a second end to the first leg, and a second support member pivotably connected at a first end to the fourth joint assembly and at a second end to the second leg, wherein the field-deployable solar panel stand is configured to transition between a collapsed configuration in which the first and second linear posts are together and an expanded configuration in which the first and second linear posts are apart.

In another aspect, the first and third joint assemblies may slide toward the second and fourth joint assemblies, respectively, as solar panel stand transitions toward the expanded configuration, and may slide apart from the second and fourth joint assemblies, respectively, as the field-deployable solar panel stand transitions toward the collapsed configuration.

In a further aspect, the ends of each of the first and second linear posts may each terminate in a post end lock assembly including a fastener adapted to engage with a grommet of a solar panel adapted to be supported on the field-deployable solar panel stand.

In a further aspect, the fastener may include a tab comprising an elongate slot, the tab slidable about a pin of the post end lock assembly disposed through the elongate slot.

In a further aspect, the foot may include a body having a first face comprising a friction-enhancing surface, and a second face pivotably attached to a bracket pivotably attaching each of the first and second legs to the foot.

In a further aspect, each of the first, second, third and fourth joint assemblies may include a sleeve and a bracket disposed at one end of the sleeve pivotably attaching at least one of the first cross member, the second cross member, the first leg, the second leg, the first support member, and the second support member to the bracket.

In a further aspect, the sleeve of the first joint assembly and the sleeve of the second joint assembly may be disposed about the first linear post facing each other, and the sleeve of the third joint assembly and the sleeve of the fourth joint assembly may be disposed about the second linear post facing each other.

In a further aspect, wherein in the collapsed configuration, the first leg and the first support member may be oriented substantially parallel to the first linear post and the second leg and the second support member may be oriented substantially parallel to the second linear post, and when in the expanded configuration the first leg and the first support member may be oriented at an angle to the first linear post and the second leg and the second support member may be oriented at an angle to the second linear post.

In a further aspect, the first cross member and the second member may be disposed between the first and second linear posts and may cross.

In another aspect, the inventive concepts disclosed herein are directed to a field-deployable solar panel stand including a plurality of parallel linear posts, a first joint assembly and a second joint assembly, first and second cross members interconnecting adjacent ones of the plurality of parallel linear posts, the first cross member pivotably connected to the first joint assembly of a first post of the adjacent ones of the plurality of parallel linear posts and to the second joint assembly of a second post of the adjacent ones of the plurality of parallel linear posts, and the second cross member pivotably connected to the second joint assembly of the first post of the adjacent ones of the plurality of parallel linear posts and to the first joint assembly of the second post of the adjacent ones of the plurality of parallel linear posts, at least one leg pivotably connected at a first end to each first joint assembly and at a second end to one of a plurality of feet, and at least one support member pivotably connected at a first end to each second joint assembly and at a second end to one of the at least one legs, wherein the field-deployable solar panel stand is configured to transition between a collapsed configuration in which the plurality of parallel linear posts are close together and an expanded configuration in which the plurality of parallel linear posts are spaced apart.

In another aspect, the field-deployable solar panel stand comprises n number of feet, n+1 number of linear posts, 2n number of legs, n number of first cross members, n number of second cross members, n+1 number of first joint assemblies, n+1 number of second joint assemblies, and 2n number of support members, wherein n is a constant variable.

In a further aspect, when in the collapsed configuration, the at least one leg and the at least one support member may be oriented substantially parallel to the plurality of parallel linear posts, and when in the expanded configuration the at least one leg and the at least one support member may be oriented at an angle to the plurality of parallel linear posts.

In another aspect, the inventive concepts disclosed herein are directed to a field-deployable solar panel stand including a plurality of posts, first and second joint assemblies slidable and fixed, respectively, along a length of each of the plurality of posts, first and second cross members interconnecting adjacent ones of the plurality of posts, the first cross member pivotably connected to the first joint assembly of a first post of the adjacent ones of the plurality of posts and to the second joint assembly of a second post of the adjacent ones of the plurality of posts, and the second cross member pivotably connected to the second joint assembly of the first post of the adjacent ones of the plurality of posts and to the first joint assembly of the second post of the adjacent ones of the plurality of posts, at least one leg pivotably connected at a first end to each first joint assembly and at a second end to one foot of a plurality of feet, and at least one support member pivotably connected at a first end to each second joint assembly and at a second end to one of the at least one legs, wherein the field-deployable solar panel stand is configured to transition between a collapsed configuration and an expanded configuration.

Embodiments of the inventive concepts can include one or more or any combination of the above aspects, features, and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

Reference throughout the specification to "one embodiment" or "an embodiment" means that a particular feature, structure, or characteristic described in connection with an embodiment is included in at least one embodiment of the subject matter disclosed. The particular features, structures or characteristics of the various embodiments disclosed herein may be combined in any suitable manner in one or more embodiments. Further, it is intended that embodiments of the disclosed subject matter cover modifications and variations thereof.

Terms used herein such as "left," "right," "top," "bottom," "front." "rear," "side," "height," "length," "width," "upper," "lower," and the like merely describe points of reference and do not necessarily limit embodiments of the present disclosure to any particular orientation or configuration. Furthermore, terms such as "first," "second," "third," etc., merely identify one of a number of parts, portions, components, etc., and likewise do not necessarily limit embodiments of the present disclosure to any particular configuration or orientation. Furthermore, the terms "approximately," "about," "proximate," "minor variation," and similar terms generally refer to ranges that include the identified value within a margin of 20%, 10% or preferably 5% in certain embodiments, and any values therebetween.

Referring to the drawing figures, a field-deployable solar panel stand is provided configured to transition between a collapsed configuration for carrying and an expanded configuration for use. The solar panel stand is provided with stabilizing feet, adjustable joint assemblies, and post end lock assemblies, among other features. The solar panel stand is preferably constructed from strong, lightweight, and corrosive-resistant materials(s) such as aluminum. The solar panel stand, in the expanded configuration thereof, can support various sizes of solar panels such as field-deployable, non-glass solar panels commercially available from SBM Solar, Inc. of Charlotte, N.C. The solar panel stand may be provided with post end lock assemblies configuration to engage with grommets on the solar panel to maintain the solar panel on the stand. The solar panel stand facilitates solar panel deployment and positioning in remote and austere locations, among other purposes and advantages.

Figure 1:
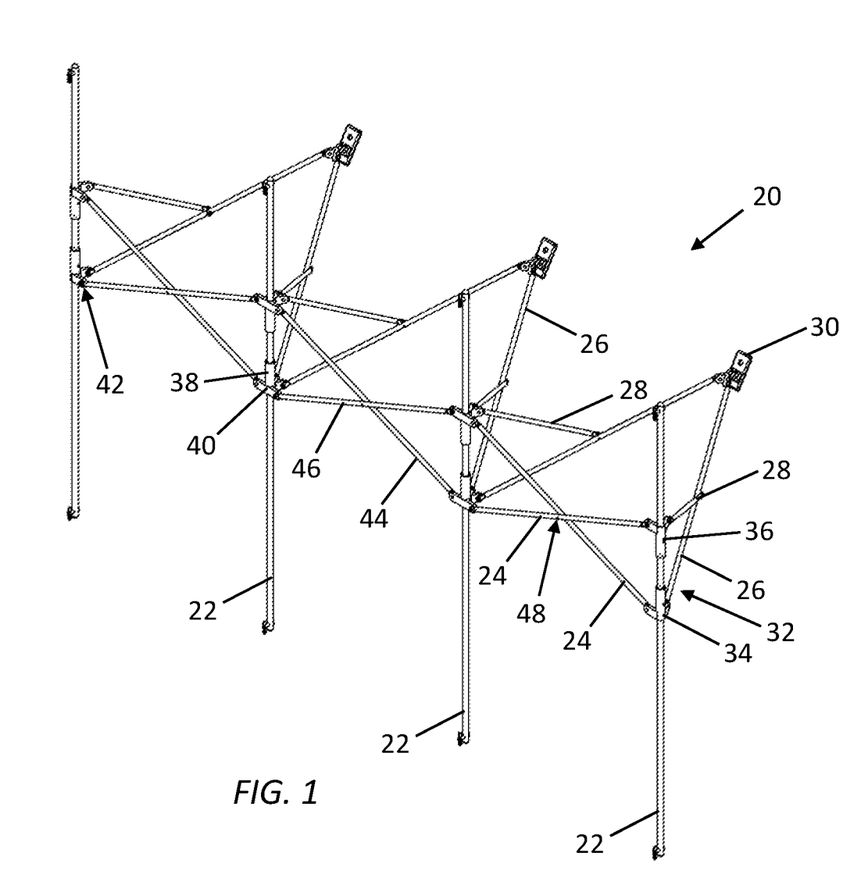
FIG. 1 is a perspective view of a solar panel stand shown in an expanded configuration.

FIG. 1 depicts a solar panel stand 20 according to an exemplary embodiment of the invention. The solar panel stand 20 generally includes elongate linear posts 22, cross members 24, legs 26, support members 28, and feet 30. The majority of components of the solar panel stand 20 interconnect through joint assemblies 32, wherein certain ones of the joint assemblies 32 are slidable along a length of the elongate linear posts 22. The elongate linear posts 22 are arranged parallel, or substantially parallel, to one another such that adjacent ones of the posts move together as the solar panel stand 20 transitions toward the collapsed configuration, and move apart as the solar panel stand 20 transitions toward the expanded configuration.

More specifically, the solar panel stand 20 includes a plurality of elongate linear posts 22, also referred to herein as "post" or "posts." Each post 20 is provided with a first joint assembly 34 and a second joint assembly 36, wherein the first joint assembly 34 is slidable along the length of the post 22 and the second joint assembly 36 is fixed in position along the length of the post 22, to facilitate to facilitate the transition between the collapsed and expanded configurations of the solar panel stand 20. The first joint assembly 34 slides toward the second joint assembly 36 as the solar panel stand 20 transitions toward the expanded configuration, and slides apart from the second joint assembly 36 as the solar panel stand 20 transitions toward the collapsed configuration.

Each joint assembly 32 generally includes a sleeve 38 and a bracket 40 disposed at one end of the sleeve. The sleeve 38 and bracket 40 may be unitary or separate components affixed together. The sleeve 38 includes a tubular length disposed around a respective one of the posts 22. Each joint assembly 32 may lock relative to the respective post 22 to prevent relative motion therebetween, for example, to lock in place the configuration of the solar panel stand 20 in the fully collapsed configuration, the fully expanded configuration, or any configuration therebetween. As shown, the first and second joint assemblies 34, 36 are disposed about the post 22 such that the sleeves 38 face each other. The bracket 40 end of each joint assembly 32 is provided with a plurality of tabs 42, for example, two tabs or four tabs, for pivotably attaching at least one of cross members 24, legs 26, and support members 28 to the joint assemblies 32.

Adjacent ones of the posts 22 are interconnected through cross members 24, and more specifically, interconnect through a first cross member 44 and a second cross member 46. The first cross member 44 is pivotably attached at one end to the first joint assembly 34 of a first one of the adjacent ones of the posts, and pivotably attached at an opposing end to the second joint assembly 36 of a second one of the adjacent posts. The second cross member 46 is pivotably attached at one end to the second joint assembly 36 of the first one of the adjacent posts, and pivotably attached at an opposing end to the first joint assembly 36 of the second one of the adjacent posts. In this arrangement, the first and second cross members 44, 46 cross and may be pivotably connected at a pivot point 48.

Each first joint assembly 34 is pivotably connected to one end of at least one of the legs 26. As shown in FIG. 1, the first joint assembly of each "outside" post 22 is pivotably connected to a single leg 26, while the first joint assembly of each "inside" post 22 is pivotably connected to two separate legs 26, wherein the two separate legs 26 are connected to separate feet 30. The same single and double connection arrangement applies to the second joint assemblies 36, wherein the second joint assembly 36 of each "outside" post 22 is pivotably connected to a single support member 28, while the second joint assembly of each "inside" post 22 is pivotably connected to two separate legs 26. In this arrangement, cross members 24 interconnected adjacent posts 22, legs 26 extend from the posts 22, and support members 28 extend from the posts to collectively provide a frame arrangement configured to collapse and expand.

The stand 20 can include 2, 3, 4, 5 . . . n number of posts. As shown, the solar panel stand 20 may include n number of feet 30, n+1 number of linear posts 22, 2n number of legs 26, n number of first cross members 24, n number of second cross members 24, n+1 number of first joint assemblies 34, n+1 number of second joint assemblies 36, and 2n number of support members 28, wherein n is a constant. Thus, in one particular example, the stand 20 may include a single foot 30, two linear posts 22, two legs 26, two cross members 24 (i.e., a first cross member and a second cross member), four joint assemblies 32 (i.e., two first joint assemblies 34 and two second joint assemblies 36), and two support members 28. In the particular embodiment shown in FIG. 1, the stand 20 includes three feet 30, four linear posts 22, six legs 26, six cross members 24 (i.e., three first cross members and three second cross members), eight joint assemblies (i.e., four first joint assemblies 34 and four second joint assemblies 36), and six support members 28. The stand size may vary based on the anticipated solar panel size to be supported.

Figure 2:
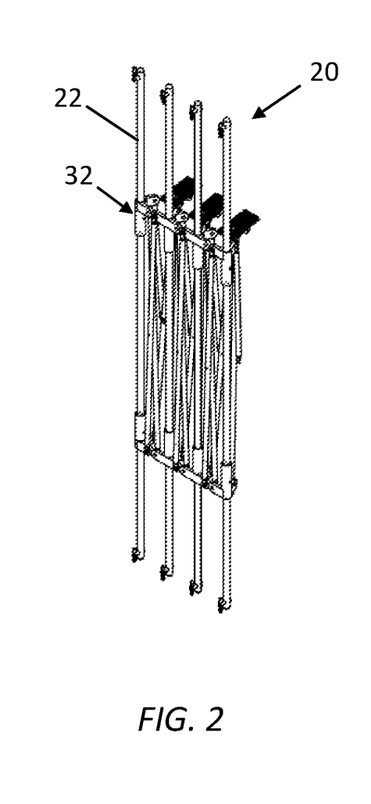
FIG. 2 is a perspective view of the solar panel stand shown in a collapsed configuration.

FIG. 2 depicts the solar panel stand 20 in the collapsed configuration wherein the linear posts 22 are positioned close together, and the legs 26 and the support members 28 are parallel or substantially parallel to the posts 22. The collapsed configuration allows the stand 22 to be carried. The stand 20 may be "locked" in the collapsed configuration by locking one or more of the joint assemblies 32 relative to its respective post 22 to prevent relative motion therebetween and thereby fix the width dimension of the stand 20, such as with a tethered pin adapted to be advanced through aligned openings through the joint assembly 32 and the post 22. Various locking positions, provided by a series of openings through the post 32, allow for various angles of the deployed stand 20. The lock may include a pin, spring-biased pin within the post, or like mechanism. Each post 22 may alternatively be constructed from telescoping members to further reduce the overall size of the stand when collapsed as well as provide additional adjustability in the size of the stand when expanded.

Figure 3:
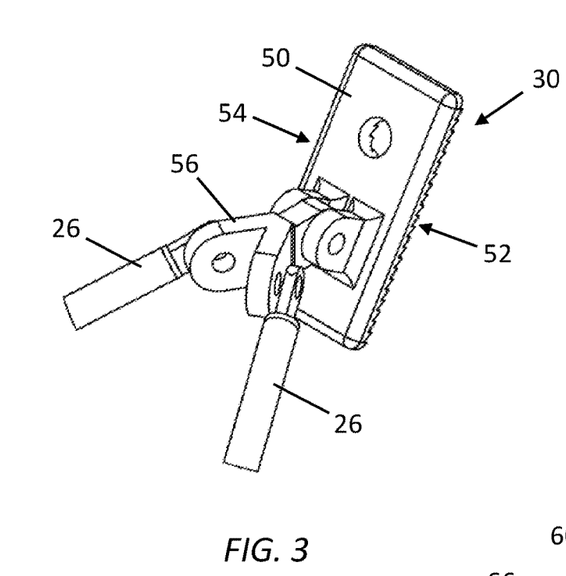
FIG. 3 is a fragmentary perspective view of a foot of the solar panel stand.

FIG. 3 depicts a single foot 30. Each foot 30 includes a body 50 having a planar bottom face 52 adapted to sit on the ground. The bottom face 52 may include friction-enhancing features or may include a material affixed thereto for enhancing friction and/or stably securing the foot to the ground. The top face 54 of the foot is pivotably attached to one end of a bracket 56. The opposing end of the bracket 56 splits into two portions, with each portion being pivotably attached to one leg 26. In this arrangement, each foot 30 is able to pivot relative to the legs 26.

Figure 4:
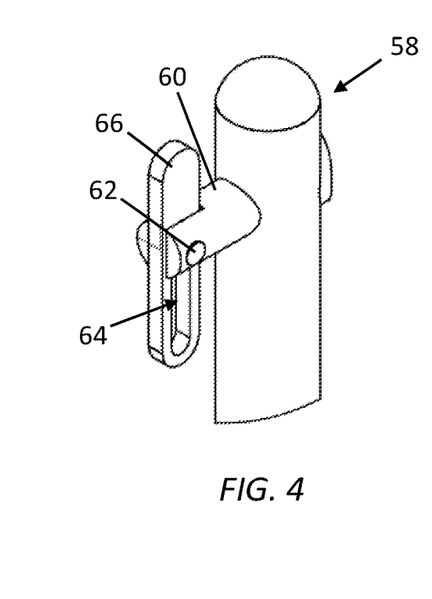
FIG. 4 is a fragmentary perspective view of a post end lock assembly.

FIG. 4 depicts a post end lock assembly 58 that can be disposed at one or both ends of each post 22. The post end lock assembly 58 generally includes a short lateral post 60 carrying a pin 62 slidably disposed through an elongate slot 64 of a separate tab 66. The tab 66 is movable relative to the lateral post 60 such that, when the pin 62 is disposed at an "inner" extent of the elongate slot 64 the tab 66 is locked perpendicular to the lateral post 60, and when the pin 62 is disposed at an "outer" end of the elongate slot 64 the tab 66 is free to rotate relative to the lateral post 60. This arrangement allows the tab 66 to be "unlocked" to rotate relative to the lateral post 60 to be inserted through a corresponding grommet of a solar panel adapted to be supported on the stand 20, and then rotated to a "locked" position whereby the tab is perpendicular to the post 60 to retain the grommet on the lateral post 60.

Figure 5:
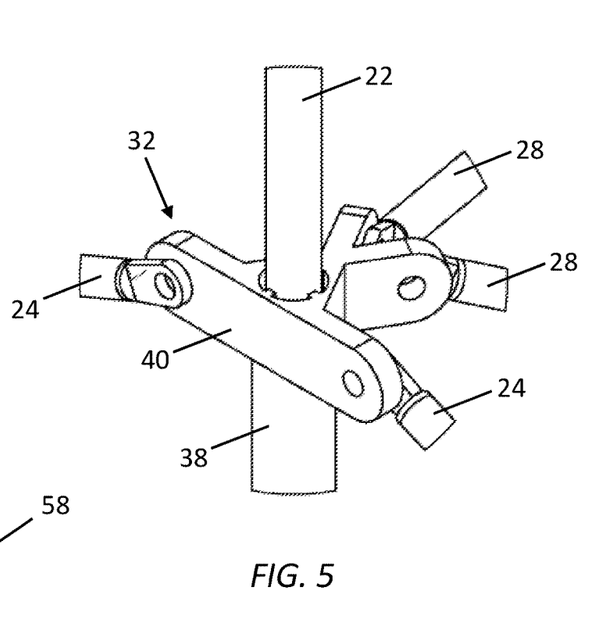
FIG. 5 is a fragmentary perspective view of a joint assembly.

FIG. 5 depicts an exemplary joint assembly 32 generally including the sleeve 38 and a bracket 40 disposed at one end of the sleeve. The sleeve 38 and bracket 40 may be unitary or separate components affixed together. The bracket 40 includes tabs that serve to pivotably attach one or more of the cross members 24, legs 26, and support members 28 to the joint assembly 32. As shown, the joint assembly is a second joint assembly 36 provided on an inside post 22, and therefore is pivotably attached to separate cross members 24, and separate support members 28.

Figure 6:
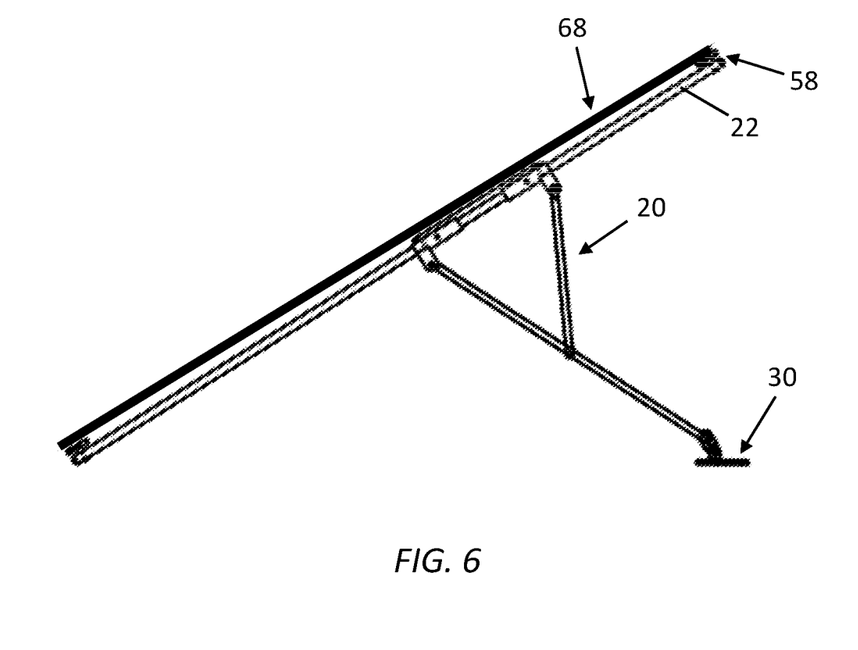
FIG. 6 is a side elevation view of the solar panel stand shown in an expanded configuration supporting a solar panel.
Figure 7:
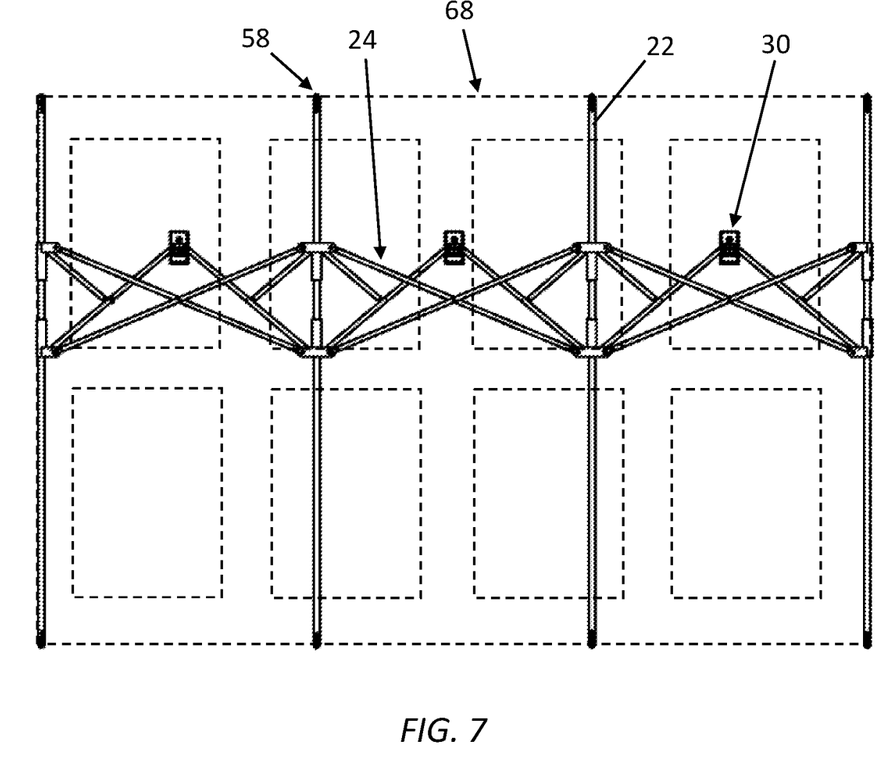
FIG. 7 is a top plan view of the solar panel stand shown in an expanded configuration supporting a solar panel.

FIGS. 6 and 7 depicts the solar panel stand 20 in the expanded configuration and in use stably supporting a deployed solar panel 68 thereon. The solar panel 68 sits atop the posts 22 and the cross members 24. The solar panel 68 can include grommets or like fastener elements adapted to engage with the post end lock assemblies 58. In the deployed configuration, the stand 20 sits on the ground or other supporting surface such that the feet 30 and one end of the posts 22 contacts the ground, thereby positioning the posts 22 at an optimum angle to horizontal to absorb sunlight, for example, 30 degrees.

Figure 8:
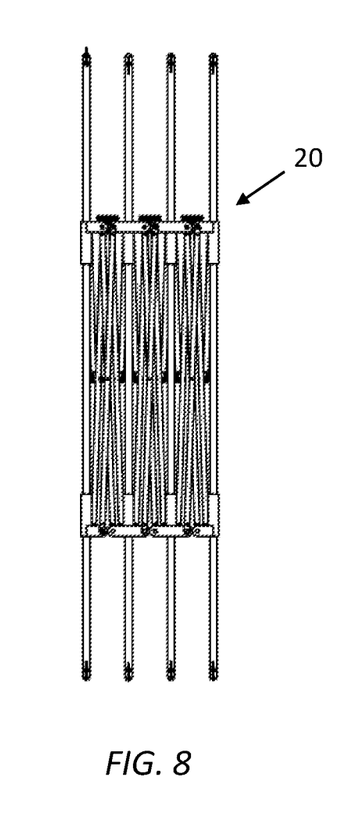
FIG. 8 is a front view of the solar panel stand shown in a collapsed configuration.
Figure 9:
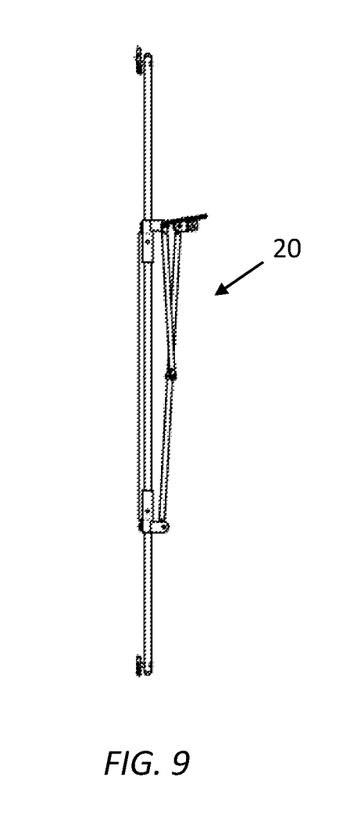
FIG. 9 is a side view of the solar panel stand shown in a collapsed configuration.
Figure 10:
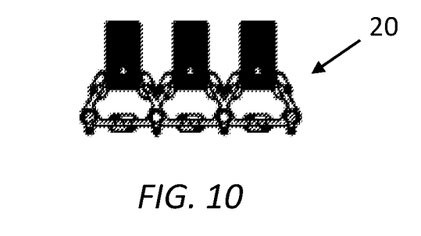
FIG. 10 is an end view of the solar panel stand shown in a collapsed configuration.

FIGS. 8-10 depict various views of the solar panel stand 20 in expanded and collapsed configurations thereof.

Figure 11:
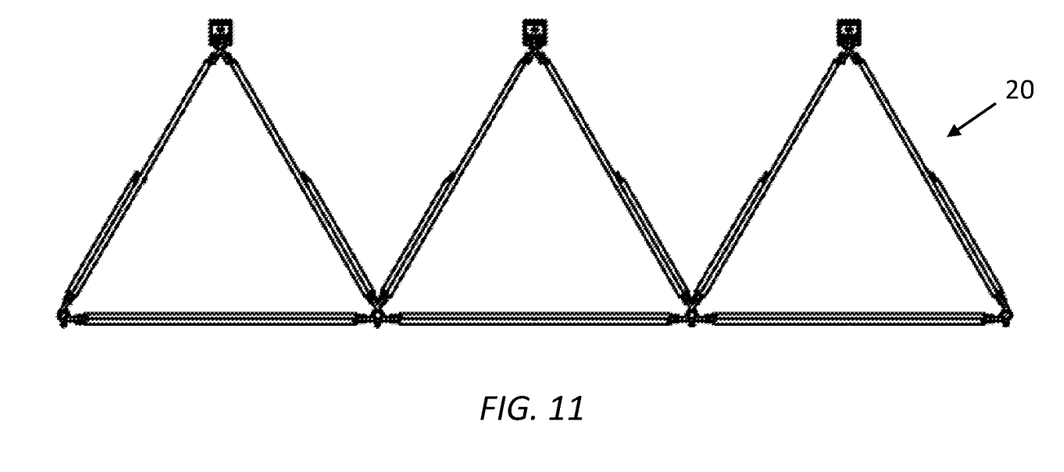
FIG. 11 is an end view of the solar panel stand shown in an expanded configuration.
Figure 12:
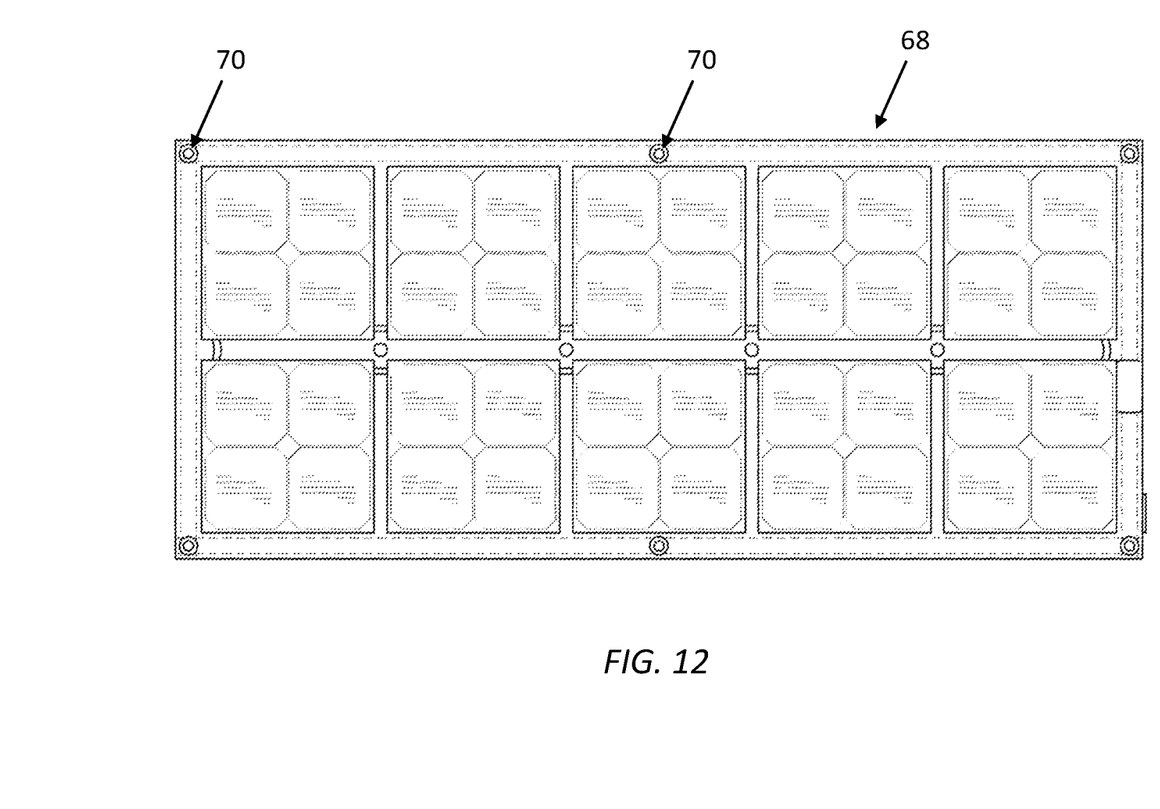
FIG. 12 is a top plan view of an exemplary solar panel suitable for use with the solar panel stand according to the present invention.

FIG. 11 depicts and example field-deployable solar panel 68 including a plurality of solar cells 72 and grommets 70 disposed along the edges of the panel for engaging with the post end lock assemblies.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A field-deployable solar panel stand, comprising:
   first and second parallel linear posts;
   first and second joint assemblies slidable along a length of the first linear post;
   third and fourth joint assemblies slidable along a length of the second linear post;
   a first cross member pivotably connected at a first end to the first joint assembly and at a second end to the fourth joint assembly;
   a second cross member pivotably connected at a first end to the second joint assembly and at a second end to the third joint assembly;
   a first leg pivotably connected at a first end to the first joint assembly and at a second end to a first foot;
   a second leg pivotably connected at a first end to the third joint assembly and at a second end to a second foot;
   a first support member pivotably connected at a first end to the second joint assembly and at a second end to the first leg; and
   a second support member pivotably connected at a first end to the fourth joint assembly and at a second end to the second leg; and
   wherein the field-deployable solar panel stand is configured to transition between a collapsed configuration in which the first and second linear posts are together and an expanded configuration in which the first and second linear posts are apart.

2. The field-deployable solar panel stand of claim 1, wherein the first and second joint assemblies, and the third and fourth joint assemblies, slide toward each other as the field-deployable solar panel stand transitions toward the expanded configuration, and slide apart from each other as the field-deployable solar panel stand transitions toward the collapsed configuration.

3. The field-deployable solar panel stand of claim 1, wherein the ends of each of the first and second linear posts each terminate in a post end lock assembly comprising a fastener adapted to engage with a grommet of a solar panel adapted to be supported on the field-deployable solar panel stand.

4. The field-deployable solar panel stand of claim 3, wherein the fastener comprises a tab comprising an elongate slot, the tab slidable about a pin of the post end lock assembly disposed through the elongate slot.

5. The field-deployable solar panel stand of claim 1, wherein each of the first foot and the second foot comprises a body having a first face comprising a friction-enhancing surface, and a second face pivotably attached to a bracket pivotably attaching one of the respective first and second legs.

6. The field-deployable solar panel stand of claim 1, wherein each of the first, second, third and fourth joint assemblies comprises a sleeve slidable along a length of a respective one of the first and second linear posts, and a bracket disposed at one end of the sleeve pivotably attaching at least one of the first cross member, the second cross member, the first leg, the second leg, the first support member, and the second support member to the bracket.

7. The field-deployable solar panel stand of claim 6, wherein the sleeve of the first joint assembly and the sleeve of the second joint assembly are disposed about the first linear post facing each other, and the sleeve of the third joint assembly and the sleeve of the fourth joint assembly are disposed about the second linear post facing each other.

8. The field-deployable solar panel stand of claim 1, wherein in the collapsed configuration, the first leg and the first support member are oriented substantially parallel to the first linear post and the second leg and the second support member are oriented substantially parallel to the second linear post, and when in the expanded configuration the first leg and the first support member are oriented at an angle to the first linear post and the second leg and the second support member are oriented at an angle to the second linear post.

9. The field-deployable solar panel stand of claim 1, wherein the first cross member and the second member are disposed between the first and second linear posts and cross.

10. A field-deployable solar panel stand, comprising;
    a plurality of parallel linear posts;
    a first joint assembly and a second joint assembly slidable along a length of each of the plurality of parallel linear posts;
    first and second cross members interconnecting adjacent ones of the plurality of parallel linear posts, the first cross member pivotably connected to the first joint assembly of a first post of the adjacent ones of the plurality of parallel linear posts and to the second joint assembly of a second post of the adjacent ones of the plurality of parallel linear posts, and the second cross member pivotably connected to the second joint assembly of the first post of the adjacent ones of the plurality of parallel linear posts and to the first joint assembly of the second post of the adjacent ones of the plurality of parallel linear posts;
    at least one leg pivotably connected at a first end to each first joint assembly and at a second end to one of a plurality of feet; and
    at least one support member pivotably connected at a first end to each second joint assembly and at a second end to one of the at least one legs;
    wherein the field-deployable solar panel stand is configured to transition between a collapsed configuration in which the plurality of parallel linear posts are close together and an expanded configuration in which the plurality of parallel linear posts are spaced apart.

11. The field-deployable solar panel stand of claim 10, wherein the field-deployable solar panel stand comprises n number of feet, n+1 number of linear posts, 2n number of legs, n number of first cross members, n number of second cross members, n+1 number of first joint assemblies, n+1 number of second joint assemblies, and 2n number of support members, wherein n is a constant variable.

12. The field-deployable solar panel stand of claim 10, wherein the first and second joint assemblies slide toward each other as the field-deployable solar panel stand transitions toward the expanded configuration, and slide apart from each other as the field-deployable solar panel stand transitions toward the collapsed configuration.

13. The field-deployable solar panel stand of claim 10, wherein each end of each of the plurality of parallel linear posts terminates in a post end lock assembly comprising a fastener adapted to engage with a grommet of a solar panel adapted to be supported on the field-deployable solar panel stand.

14. The field-deployable solar panel stand of claim 10, wherein each foot of the plurality of feet comprises a body having a first face comprising a friction-enhancing surface, and a second face pivotably attached to a bracket pivotably attaching two of the legs to the foot.

15. The field-deployable solar panel stand of claim 10, wherein each of the first and second joint assemblies comprises a sleeve slidable along a length of a respective one of the plurality of parallel linear posts, and a bracket disposed at one end of the sleeve pivotably attaching at least one the first cross member, the second cross member, the at least one leg, and the at least one support member to the bracket.

16. The field-deployable solar panel stand of claim 15, wherein the sleeve of the first joint assembly is positioned facing the sleeve of the second joint assembly.

17. The field-deployable solar panel stand of claim 10, wherein when in the collapsed configuration, the at least one leg and the at least one support member are oriented substantially parallel to the plurality of parallel linear posts, and when in the expanded configuration the at least one leg and the at least one support member are oriented at an angle to the plurality of parallel linear posts.

18. The field-deployable solar panel stand of claim 10, wherein the first and second cross members are disposed between adjacent ones of the plurality of parallel linear posts and cross.

19. A field-deployable solar panel stand, comprising;
a plurality of posts;
first and second joint assemblies slidable along a length of each of the plurality of posts;
first and second cross members interconnecting adjacent ones of the plurality of posts, the first cross member pivotably connected to the first joint assembly of a first post of the adjacent ones of the plurality of posts and to the second joint assembly of a second post of the adjacent ones of the plurality of posts, and the second cross member pivotably connected to the second joint assembly of the first post of the adjacent ones of the plurality of posts and to the first joint assembly of the second post of the adjacent ones of the plurality of posts;
at least one leg pivotably connected at a first end to each first joint assembly and at a second end to one foot of a plurality of feet; and
at least one support member pivotably connected at a first end to each second joint assembly and at a second end to one of the at least one legs;
wherein the field-deployable solar panel stand is configured to transition between a collapsed configuration and an expanded configuration.

20. The field-deployable solar panel stand of claim 19, wherein the field-deployable solar panel stand comprises n number of feet, n+1 number of linear posts, 2n number of legs, n number of first cross members, n number of second cross members, n+1 number of first joint assemblies, n+1 number of second joint assemblies, and 2n number of support members, wherein n is a constant variable.

* * * * *